(12) United States Patent
Zanzola

(10) Patent No.: US 7,480,318 B2
(45) Date of Patent: Jan. 20, 2009

(54) SIDE-PUMPED SOLID-STATE LASER SOURCE, AND PUMPING PROCESS FOR A SOLID-STATE LASER SOURCE

(75) Inventor: Paola Zanzola, Cassolnovo (PV) (IT)

(73) Assignee: Laservall S.p.A., Donnas (AO) (IT)

( * ) Notice: Subject to any disclaimer, the term of this patent is extended or adjusted under 35 U.S.C. 154(b) by 0 days.

(21) Appl. No.: 11/511,326

(22) Filed: Aug. 29, 2006

(65) Prior Publication Data
US 2007/0047611 A1    Mar. 1, 2007

(30) Foreign Application Priority Data
Aug. 29, 2005    (IT)    .......................... MI2005A1609

(51) Int. Cl.
*H01S 3/04*    (2006.01)
*H01S 3/08*    (2006.01)
*H01S 3/093*    (2006.01)

(52) U.S. Cl. .......................... 372/34; 372/101; 372/72

(58) Field of Classification Search .................. 372/72, 372/101, 34
See application file for complete search history.

(56) References Cited
U.S. PATENT DOCUMENTS

| | | | | |
|---|---|---|---|---|
| 5,276,695 A | * | 1/1994 | Scheps | 372/20 |
| 5,724,372 A | * | 3/1998 | Stultz et al. | 372/11 |
| 5,909,306 A | * | 6/1999 | Goldberg et al. | 359/337.1 |
| 6,212,216 B1 | * | 4/2001 | Pillai | 372/96 |
| 6,347,101 B1 | * | 2/2002 | Wu et al. | 372/18 |
| 2005/0253056 A1 | * | 11/2005 | Nakata | 250/234 |

* cited by examiner

*Primary Examiner*—Minsun Harvey
*Assistant Examiner*—Patrick Stafford
(74) *Attorney, Agent, or Firm*—Oblon, Spivak, McClelland, Maier & Neustadt, P.C.

(57) ABSTRACT

The side-pumped solid-state laser source comprises a resonant cavity defined by at least two spaced-apart mirrors, an active medium of laser crystal type placed in said resonant cavity, and a pumping source, the layout of the resonant cavity, defined by the crystal and by the mirrors, being arranged to cause spatial inversion of the oscillating mode within the active medium in the absorption direction of the pumping beam, such as to symmetrize the thermal focal length seen by the oscillating mode. The laser source comprises lenses for conditioning the pumping beam emitted by the pumping source, to form on the side face of the laser crystal a pumping spot arranged to symmetrize the spatial quality of the emitted laser beam and/or active control means for the laser crystal temperature, in order to correct its undesired astigmatic effects. The pumping process for the solid-state laser source generates on the side face of the laser crystal a pumping spot arranged to symmetrize the spatial quality of the emitted laser beam, in such a manner as to correct its undesired astigmatism effects.

19 Claims, 5 Drawing Sheets

SIDE-PUMPED SOLID-STATE LASER SOURCE, AND PUMPING PROCESS FOR A SOLID-STATE LASER SOURCE

FIELD OF THE INVENTION

The present invention relates to a side-pumped solid-state laser source for industrial applications and a pumping process for a solid-state laser source.

BACKGROUND OF THE INVENTION

In particular, the invention relates to a solid-state laser source of neodymium-host type, comprising an active medium side-pumped by a laser diode and lenses for conditioning the pumping beam using a cavity layout for which the oscillating mode undergoes total reflection within the active crystal on the face struck by the pumping beam.

With the proposed layout and without the need to use cavity lenses, undesirable astigmatism effects can be corrected typical of a source using a side pumping system, and the spatial quality of the generated beam can be carefully controlled.

DISCUSSION OF THE RELATED ART

Traditionally, a solid-state laser source with a diode side-pumping system consists of a crystal (as active medium) of circular section (rod) or rectangular section (slab), in which the oscillating mode is propagated in a longitudinal direction, passing through the crystal centre.

The pumping beam strikes the crystal in a direction perpendicular to the propagation direction of the oscillating mode within the cavity and originates from at least one laser diode positioned to the side of the crystal.

The most common problems linked to a side-pumping geometry of this type relate to the distribution of the pumping beam within the crystal, which is dishomogeneous and negatively influences the thermal focal length generated within the crystal.

Another problem is the poor optimisation of the spatial superposing (matching) between the pumping beam and the fundamental oscillating mode within the cavity, which negatively influences the spatial quality of the generated laser beam.

Consider a rectangular section (slab) crystal side-pumped by a single laser diode, as in FIG. 1A; if the crystal is pumped through only the side face 1 and cooled symmetrically through the faces 5 and 6, the temperature profiles obtained in the two directions x and y are shown in FIGS. 1B, 1C.

In the pumping beam absorption direction x, the temperature profile is virtually defined by the characteristics of the active medium and in particular by the absorption coefficient related to the working wavelength. If the crystal is pumped (i.e. struck by the pumping beam) asymmetrically on only one side, with homogeneous distribution of the pumping beam along the z axis and the opposite side is left free, the temperature profile along the x axis is strongly asymmetric, as the pumped side is extremely hot and the opposite side is cold. Consequently, the thermal focal length along the x axis is strongly asymmetric. In contrast, along the y axis the temperature is clearly very high at the centre of the crystal and low at the edges, along the cooled faces, so that the temperature profile is symmetrical and the thermal focal length behaves as a cylindrical lens.

In a system of this type it is extremely difficult to optimise power extraction and to control the spatial quality of the generated laser beam.

To overcome the problem of thermal focal length asymmetry perceived by the oscillating mode within the cavity along the horizontal axis, a cavity scheme has been introduced in which the active medium is a crystal of the type shown in FIG. 2A; the two opposing side faces 3 and 4 are cut at an angle greater than 0°, so that the oscillating mode which propagates along the z axis is refracted at the crystal entry, undergoes total reflection relative to the x axis at the face on which the pumping beam 1 strikes, and is again refracted at the crystal exit.

The crystal is again pumped through a single side face, hence the temperature profile remains asymmetric along the x axis, but the internal reflection causes spatial inversion of the beam such that the thermal focal length seen on average by the beam along the x axis is symmetrical. With this expedient, the thermal focal length is symmetric both along the x axis and along the y axis, but with generally a different focal power in the two directions, as shown in FIGS. 2B and 2C.

SUMMARY OF THE INVENTION

The technical aim of the present invention is therefore to provide a side-pumped solid-state laser source for industrial applications and a pumping process for a solid-state laser source by which the stated problems of the known art are eliminated.

Within the scope of this technical aim, an object of the invention is to provide a solid-state laser source presenting a thermal focal length which is substantially equal in the two x and y directions, and a spatial quality which is substantially symmetrical in the same directions.

Another object of the invention is to provide a laser source which is optimised, compact and economical.

The technical aim, together with these and further objects, are attained according to the present invention by a side-pumped solid-state laser source for industrial applications and a pumping process for a solid-state laser source in accordance with the accompanying claims.

Advantageously, in order to equalize the thermal focal length along the x and y axes, the vertical dimension of the pumping spot is regulated by possibly inserting a cylindrical lens with focal power along the y axis between the pumping laser diode and the active medium, such that the relationship between the vertical dimension of the pumping spot and the vertical dimension of the crystal generates a temperature profile of a pattern comparable to that in the x direction, as shown in FIGS. 4B, 4C. Additionally, active temperature control of the cooled crystal faces has been introduced using a Peltier cell, in order to symmetrize the thermal focal length.

BRIEF DESCRIPTION OF THE DRAWINGS

Further characteristics and advantages of the invention will be more apparent from the description of a preferred but non-exclusive embodiment laser source and of the process according to the invention, illustrated by way of non-limiting example in the accompanying drawings, in which.

DETAILED DESCRIPTION OF THE INVENTION

Figure 3:
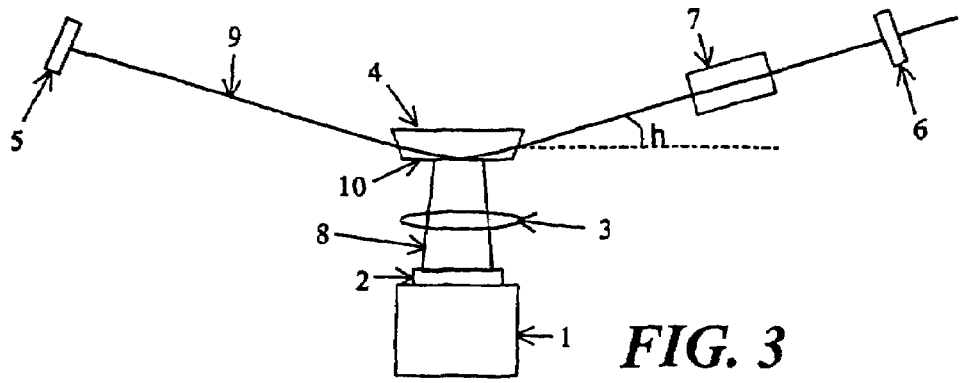
FIG. 3 shows schematically the architecture of the laser source described in accordance with the present invention.
Figure 1A:
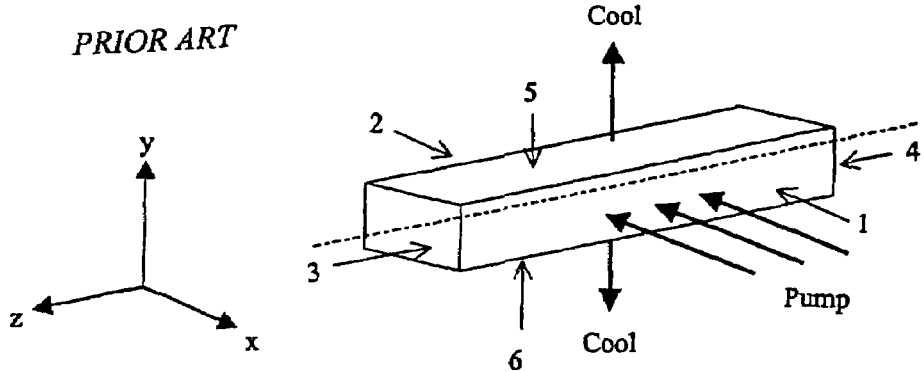
FIG. 1A shows an active crystal of traditional type.
Figure 1B:
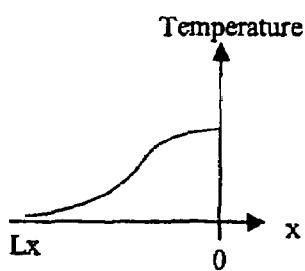
FIGS. 1B and 1C show schematically the pattern of the temperature profiles of the active crystal of FIG. 1A along the x and y axis respectively.
Figure 1C:
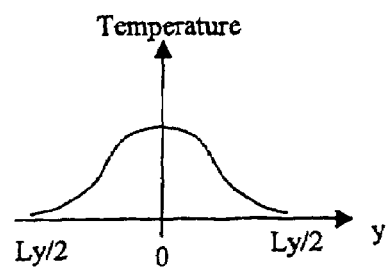
Figure 2A:
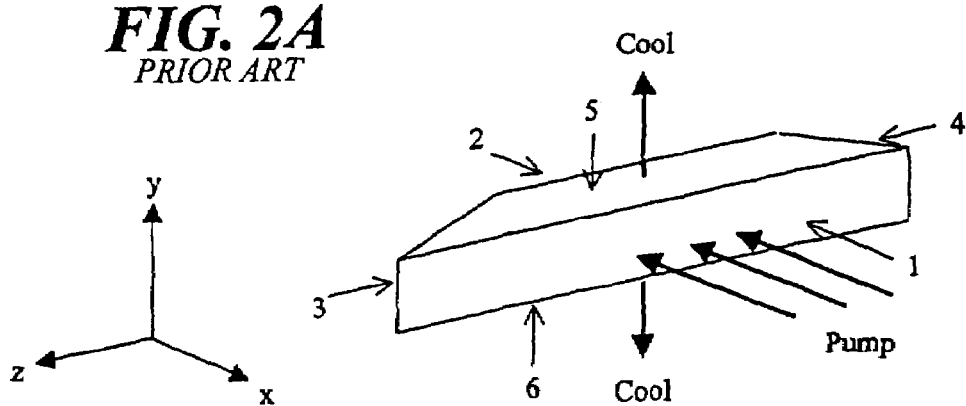
FIG. 2A shows a different active crystal of traditional type with which symmetrization of the thermal focal length seen by the oscillating mode is facilitated.
Figure 2B:
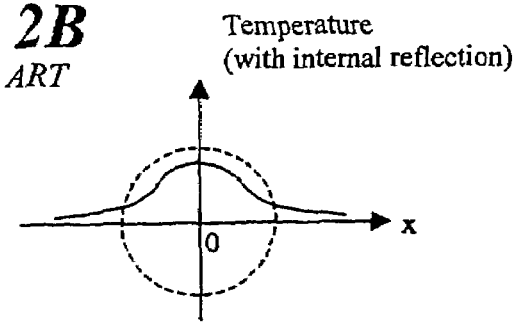
FIGS. 2B and 2C show schematically the pattern of the temperature profiles of the active crystal of FIG. 2A along the x axis and y axis respectively.
Figure 2C:
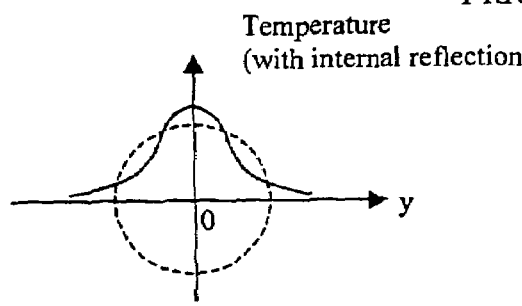
Figure 4A:
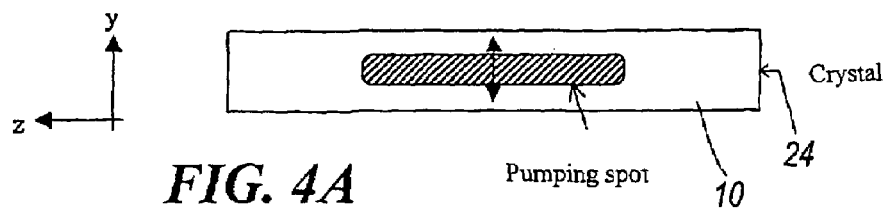
FIG. 4A is a front view of an active crystal with the impression of the pumping beam spot according to the invention.
Figure 4B:
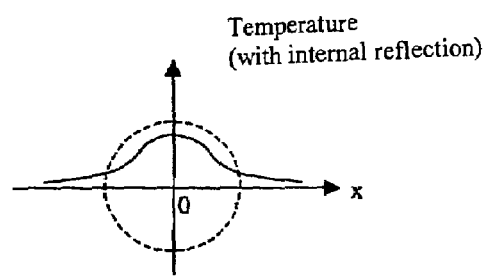
FIGS. 4B and 4C show schematically the pattern of the temperature profiles of the active crystal of FIG. 4A along the x axis and y axis respectively.
Figure 4C:
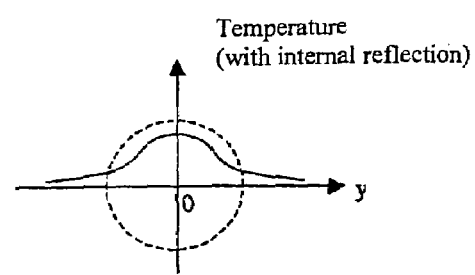

With reference to said figures, these show a side-pumped solid-state laser source for industrial applications, indicated overall by the reference numeral 20.

The laser source 20 comprises a resonant cavity 21 defined by at least two spaced-apart mirrors 22, 23, an active medium of laser crystal type 24 positioned in the resonant cavity, means 25 for actively controlling the temperature of the laser crystal 24, and a Q-switch 26 positioned in the resonant cavity 21 between the laser crystal 24 and one of the two mirrors (the mirror 22 in the illustrated embodiment).

The laser source 20 also comprises a laser diode pumping source.

The cavity layout (this expression meaning the crystal together with the mirrors defining the cavity) and the lenses for conditioning the pumping beam are arranged to cause spatial inversion of the oscillating mode within the active medium in the absorption direction of the pumping beam, such as to symmetrize the thermal focal length seen by the mode.

Advantageously, the laser source of the invention comprises lenses for conditioning the pumping beam emitted by the pumping source, to form on the side face of the laser crystal a pumping spot for symmetrizing the spatial quality of the emitted laser beam, in order to correct its undesired astigmatism effects.

At least one of the two mirrors is partially reflecting to allow emission of the laser beam, the active medium or crystal being a Nd-host crystal presenting a first side face 1 to be struck by the pumping beam, a second side face 2 opposite the first, an upper face 5, a lower face 6 opposite the upper face, and two side faces 3, 4 perpendicular to upper face 5 and lower face 6 and inclined to form an obtuse angle with the first side face 1.

The active control means 25 for the laser crystal temperature are a Peltier cell arranged to cool the laser crystal via the upper face 5 and lower face 6, such that the temperature of said faces can be maintained equal and can be controlled.

The Q-switch 26 consists of an acoustic-optical modulator or, in a different embodiment, is an electro-optical modulator or, in a different embodiment, is of passive type, while the pumping source consists of an array of laser diodes operating in continuous regime.

In a first embodiment, the lenses conditioning the pumping beam comprise a cylindrical microlens mounted in proximity to the diode emitters, in order to collimate or reduce the divergence of the pumping beam along the fast axis.

In a different embodiment the conditioning lenses comprise at least one cylindrical lens with focal power along the slow axis of the laser diode, such as to intercept the pumping beam emitted by said laser diode and create on the side face of the crystal an image of suitable dimension in the direction of the slow axis.

Preferably, the conditioning lenses comprise a further cylindrical lens with focal power along the laser diode fast axis, in order to intercept the pumping beam emitted by said laser diode and create on the side face of the crystal an image of suitable dimension in the direction of the fast axis.

The source also comprises a system for moving the cylindrical lens along the pumping beam propagation axis.

The spatial quality of the generated laser beam is suitably controlled by acting on the dimension of the pumping spot created on the side face of the crystal along the two directions perpendicular to the direction of propagation of the pumping beam and parallel to the crystal axes.

The solid-state laser source utilizes the principle of beam inversion within the space struck by the pumping beam to symmetrize the thermal focal length seen by the oscillating mode in the cavity, and in which a very effective system is used to carefully correct the astigmatism typical of a side-pumping scheme and to control and symmetrize the spatial quality of the generated laser beam.

Figure 5:
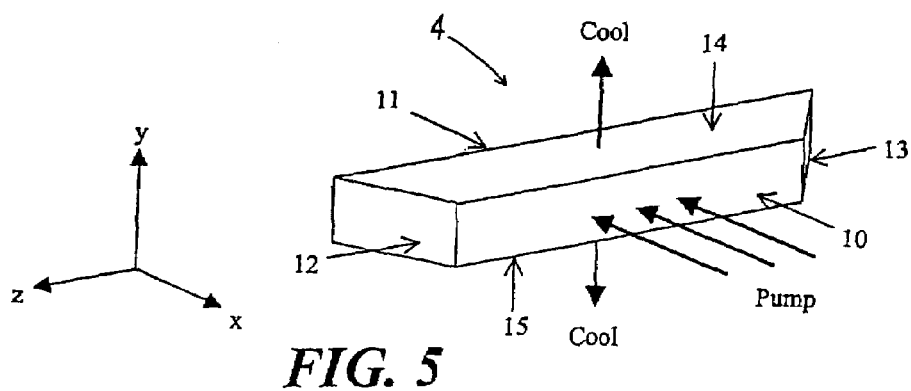
FIG. 5 is a perspective view of a crystal of the type used in accordance with the present invention.

By way of non-limiting example, the cavity layout is of the type shown schematically in FIG. 3, in which the active medium 4 is a Nd:YVO4 crystal of the type shown in FIG. 5, the side faces 12 and 13 being cut at an angle $\alpha > 0°$ to the x axis and form an obtuse angle with the face 10 struck by the pumping beam. The laser beam oscillating in the cavity strikes the side faces 12 and 13, is refracted into the crystal in accordance with normal optical rules because of the inclination of said faces and undergoes total reflection relative to the x axis on the face 10, on which it strikes with an angle of grazing incidence of a few degrees, determined by the crystal geometry and characteristics and by the angle of incidence of the beam.

The crystal is side-pumped by a laser diode source via the face 10 and cooled symmetrically via the faces 14 and 15, while the face 11 is left free.

As described in greater detail hereinafter, in the laser source of the invention, the thermal focal length seen by the oscillating mode can be controlled and symmetrized in the two x and y directions, both by controlling the vertical dimension of the pumping spot relative to the vertical dimension of the active crystal and by actively controlling the cooling temperature of the faces 14 and 15, and the spatial quality of the generated laser beam can be controlled and symmetrized by acting on the horizontal dimension, along z, of the pumping spot which forms on the crystal side face 10.

The cavity is of symmetrical type, of total length 125 millimetres and bounded by two flat mirrors. The active crystal is positioned at the cavity centre, an acusto-optical Q-switch 7 being mounted in a suitable position along the arm which terminates with the exit connector 6.

Figure 6:
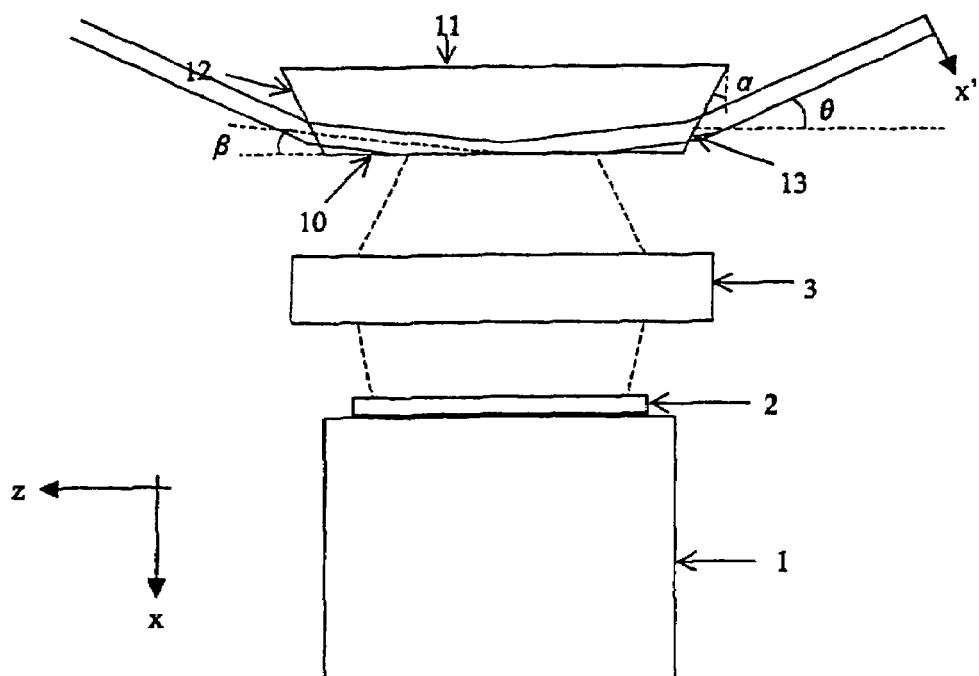
FIG. 6 shows schematically the propagation of the pumping beam and of the laser oscillating mode within the cavity.

The active medium, (FIGS. 5-6) is a 1.1% Nd-doped Nd:YVO4 crystal of dimensions 12×4×3 mm along the z, x and y axes respectively. The side faces 12, 13 are cut at an angle of about 6° to the x axis, to prevent triggering of spurious oscillations in the cavity. The face 10 is struck by the pumping beam originating from a laser diode source 1 suitably treated by the conditioning lenses 2 and 3. The lens 2 is a cylindrical microlens mounted in proximity to the array of laser diode emitters, at a distance such as to collimate the pumping beam along the y axis (fast axis) or to drastically reduce its divergence, while the lens 3 is a cylindrical lens with focal power along the z axis (slow axis for the laser diode), mounted at a suitable distance from the laser diode and from the face 10 of the active crystal.

Having fixed the distance between the laser diode 1 and the active medium 4, the position of the lenses 2 and 3 uniquely defines the pumping spot dimension along y and z respectively, on the crystal entry face 10.

The crystal is cooled via the faces 14 and 15 and temperature controlled by a Peltier cell, such as to be able to actively control the cooling temperature. The face 11 is left free.

Having fixed a working condition, the temperature profile along the x axis is substantially established by the characteristics of the chosen active medium and is asymmetric, as the crystal is pumped (and hence heated) by only a single side face, while the opposite face is left free. The thermal focal length induced along x is therefore asymmetric. Along the y axis the temperature profile is symmetric and defined by the ratio between the pumping spot dimension along y and the crystal dimension along the same axis, and by the cooling temperature of the faces 14 and 15. In this case, the thermal focal length induced along y is symmetrical.

The laser mode oscillating in the cavity strikes the crystal side faces 12 and 13 with an angle θ of about 20° to the z axis, is refracted into the active medium and strikes the face 10 at an angle β of about 7°. On the same face 10 it undergoes total reflection relative to the x axis and hence a spatial inversion, which enables the temperature profile perceived by the beam to be symmetrized.

Without further expedients the thermal focal length seen by the laser mode is symmetrical both along x and along y, but in general has different focal power in the two directions. As the cavity is supported only by the thermal focal length, under these conditions the generated laser beam presents an astigmatic spatial profile and, in general, a different spatial quality in the two directions.

The temperature profile along y can hence be made to have a pattern similar to that along x either by acting on the vertical dimension of the pumping spot, by fine adjustment of the position of the microlens 2 along the x axis, or by inserting a cylindrical lens with focal power along the y axis between the laser diode and the active medium, either located in a suitable position or having its position adjustable by a dedicated movement system, or by acting on the temperature of the cooled faces, by adjusting the working point of the thermoelectric (Peltier) cell which controls the temperature of the crystal faces 14 and 15 such that the thermal focal length seen by the oscillating mode in the cavity has the same focal power along the two axes.

This favours maximization of the laser source performance in terms of power extraction and spatial symmetry of the beam profile.

To optimize the spatial quality of the laser beam, the following is to be considered: having fixed the cavity length and defined the value of the thermal focal length, the dimension of the fundamental mode within the crystal is uniquely determined and, as a first approximation, the beam spatial quality is defined by the ratio of the dimension of the oscillating mode within the active medium to the dimension of the pumping spot transverse to it.

Hence along the y axis the beam spatial quality is defined once the vertical dimension of the pumping spot has been fixed, which can be optimised, as stated, by finely adjusting the position of the cylindrical microlens 2 positioned in proximity to the emitters of the laser diode 1 or by inserting between the laser diode and the crystal a cylindrical lens with focal power along the y axis, either located in a suitable position or of which the position can be adjusted by a dedicated movement system.

In contrast, along the x' axis (perpendicular to y and to the beam propagation direction and lying in the x-z plane) it must be considered that the beam is completely projected onto the face 10 struck by the pumping beam which intercepts it and undergoes total reflection thereon. Consequently, the relationship between the horizontal dimension of the pumping spot along the z axis and the laser beam dimension on the face 10 along the same axis influences the spatial quality of the laser mode. By moving the cylindrical lens 3 along the x axis using a dedicated movement system, the horizontal dimension of the pumping spot on the crystal face 10 can be modified, hence as can its relationship to the fundamental mode dimension, in such a manner as to symmetrize and optimise the spatial quality of the generated laser beam along the two perpendicular directions x' and y.

With the proposed system a laser source with polarized beam along the y axis is obtained having a mean power of the order of 10 W and a spatial quality factor $M^2$ symmetrical in x and y and less than 2, operating in the Q-switch regime with a repetition frequency from 20 kHz to values exceeding 100 kHz and pulse time duration from 10 ns to about 25 ns. The system is air-cooled, extremely compact and simple to assemble while using largely commercial components, hence facilitating availability and maintaining a low construction cost.

Figure 7:
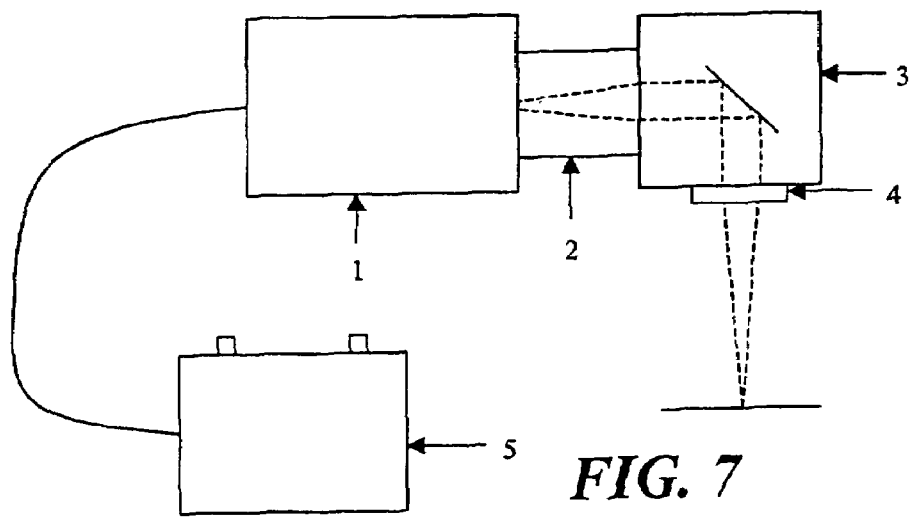
FIG. 7 shows schematically the laser marking system described in accordance with the present invention.
Figure 8:
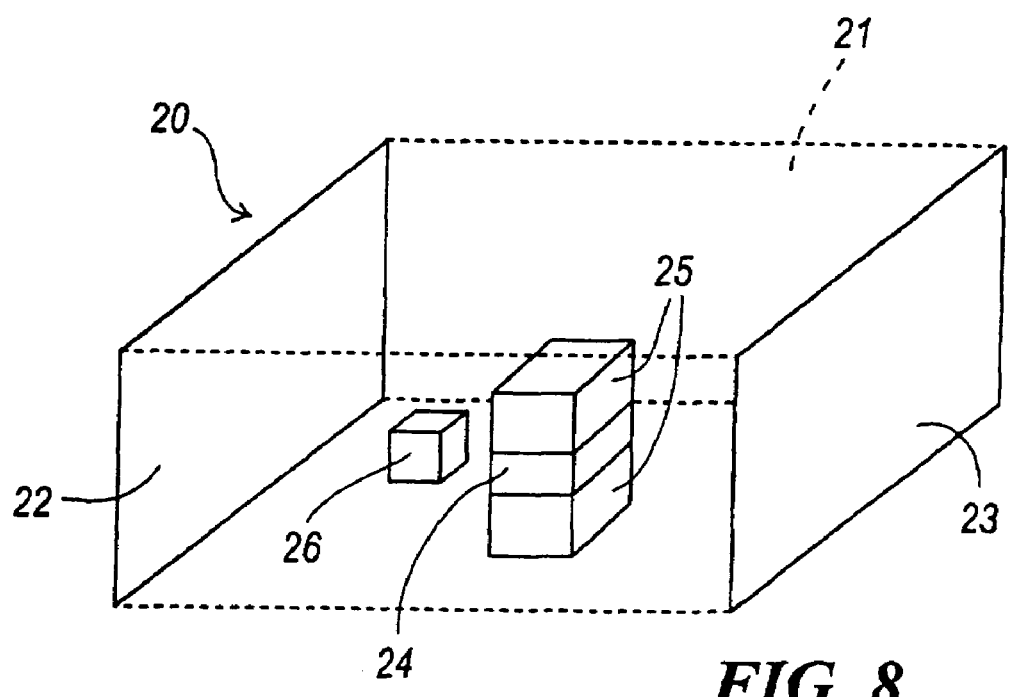
FIG. 8 shows a detail of the cavity according to the invention.

The source can then be assembled into a marking laser source of the type shown schematically in FIG. 7.

Mounted at the exit of the laser source 1 there are provided a beam expander system 2 of magnification factor such as to adjust the beam diameter (1/e2) to about 5-6 mm and a galvanic mirror scanning head 3 with a beam focusing system in the form of a focusing flat field lens 4. Mounted on the machine are the pumping diode control electronics, the temperature controller for the diode and crystal and the acusto-optical Q-switch driver, the power unit being remotely located in a dedicated power module 5.

Marking and incision operations were carried out with this system on the most common metal and plastic materials.

The present invention also relates to a pumping process for a solid-state laser source.

The process consists of generating on the side face of a laser crystal a pumping spot able to symmetrize the spatial quality of the emitted laser beam, such as to correct its undesired astigmatism effects.

Preferably, the process consists of striking with the pumping beam a laser crystal provided with inclined side faces forming an obtuse angle to a first entry face of the pumping beam within the same crystal, in which the oscillating mode in the cavity strikes one of the inclined side faces of the crystal, is refracted into the crystal, strikes the first face struck by the pumping beam at an angle such as to undergo total reflection at said first face about the pumping beam absorption direction together with consequent spatial inversion, and is refracted out of the crystal at the second inclined face.

The temperature pattern within the crystal and consequently the thermal focal length in the cooling direction are defined by the relationship between the dimension of the pumping spot created on the crystal side face in the same direction and the physical dimension of the crystal itself, and by the cooling temperature to which the upper and lower crystal faces are lowered.

Modifications and variants in addition to those already stated are possible; for example, the pumping source of continuous type can also consist (in addition to a laser diode or an array of laser diodes) of a stack of laser diodes operating under continuous regime.

In addition, the pumping source can consist of a source operating under quasi-continuous (quasi-CW or QCW) regime, in which case the Q-switch within the cavity may or may not be provided.

For example, the source operating under quasi-continuous (quasi-CW or QCW) regime can consist of a laser diode array operating under quasi-continuous (quasi-CW or QCW) regime or a stack of laser diodes operating under quasi-continuous (quasi-CW or QCW) regime.

In practice any materials and dimensions can be used, depending on requirements and on the state of the art.

What I claim is:

1. A side-pumped solid-state laser source comprising;
    a resonant cavity defined by at least two spaced-apart mirrors;
    an active medium of laser crystal type located in said resonant cavity; and
    a pumping source,
    wherein a layout of the resonant cavity is defined by the crystal and by at least two spaced-apart mirrors arranged to cause spatial inversion of the oscillating mode within the active medium in an absorption direction of a pumping beam of the pumping source to symmetrize a thermal focal length seen by the oscillating mode, said laser source comprising lenses for conditioning the pumping beam to form on a first side face of the laser crystal a pumping spot arranged to symmetrize a spatial quality of the emitted laser beam and/or active control means for controlling a temperature of said laser crystal, in order to correct astigmatic effects.

2. A solid-state laser source as claimed in claim 1, wherein said pumping source operates under continuous regime.

3. A solid-state laser source as claimed in claim 2, wherein said pumping source comprises a laser diode, or an array of laser diodes, or a stack of laser diodes operating under continuous regime.

4. A solid-state laser source as claimed in claim 1, wherein said pumping source operates under quasi-continuous or quasi-CW or QCW regime.

5. A solid-state laser source as claimed in claim 4, wherein said pumping source comprises a laser diode, or an array of laser diodes, or a stack of laser diodes operating under quasi-continuous or quasi-CW or QCW regime.

6. A solid-state laser source as claimed in claim 1, further comprising:
    a Q-switch positioned in said resonant cavity between the laser crystal and one of the spaced-apart two mirrors.

7. A solid-state laser source as claimed in claim 1, wherein at least one of said two spaced-apart mirrors is partially reflecting, to enable emission of the laser beam.

8. A solid-state laser source as claimed in claim 1, wherein the active medium is an Nd-host crystal presenting the first side face coincident with the pumping beam, a second side face opposite the first, an upper face, a lower face opposite the upper face, and two side faces perpendicular to the upper face and the lower face and inclined to form an obtuse angle with said first side face.

9. A solid-state laser source as claimed in claim 1, wherein the active control means for the laser crystal temperature is arranged to cool said laser crystal via upper and lower faces thereof, such that the temperature of said upper and lower faces is maintained equal and controllable.

10. A solid-state laser source as claimed in claim 6, wherein the Q-switch is an acousto-optical modulator.

11. A solid-state laser source as claimed in claim 6, wherein the Q-switch is an electro-optical modulator.

12. A solid-state laser source as claimed in claim 6, wherein the Q-switch is of passive type.

13. A solid-state laser source as claimed in claim 1, wherein the conditioning lenses of the pumping beam comprise a cylindrical microlens mounted in proximity to emitters of the pumping source to collimate or reduce the divergence of the pumping beam along a fast axis.

14. A solid-state laser source as claimed in claim 1, wherein the conditioning lenses comprise at least one cylindrical lens with focal power along a slow axis of the pumping source, to intercept the pumping beam emitted by said pumping source and create on the side face of the crystal an image in the direction of the slow axis.

15. A solid-state laser source as claimed in claim 1, wherein the conditioning lenses comprise a further cylindrical lens with focal power along the fast axis of the pumping source, in order to intercept the pumping beam emitted by said pumping source and create on the side face of the crystal an image in the direction of the fast axis.

16. A solid-state laser source as claimed in claim 13 or 14 or 15, further comprising:
    a system for moving the cylindrical lens along the pumping beam propagation axis.

17. A solid-state laser source as claimed in claim 1, wherein the spatial quality of a generated laser beam is controlled by acting on a dimension of the pumping spot created on the side face of the crystal along two directions perpendicular to the direction of propagation of the pumping beam and parallel to a crystal axes.

18. A solid-state laser source as claimed in claim 1, further comprising:
    an expander system for the laser beam generated by said source, a galvanic mirror laser beam scanning system, and a beam focusing lens.

19. A laser marking device comprising a laser source claimed in claim 1, further comprising:
    an expander system for the laser beam generated by said source, a galvanic mirror laser beam scanning system, and a beam focusing lens.

* * * * *